United States Patent
Kadirvel et al.

(10) Patent No.: US 11,300,999 B1
(45) Date of Patent: Apr. 12, 2022

(54) ARTIFICIAL-REALITY HEADSET ASSEMBLY WITH BACK-OF-THE-HEAD BATTERY

(71) Applicant: FACEBOOK TECHNOLOGIES, LLC, Menlo Park, CA (US)

(72) Inventors: Karthik Kadirvel, San Jose, CA (US); Jason Howard, Alpharetta, GA (US); Myuran Kangatharalingam, Sunnyvale, CA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 298 days.

(21) Appl. No.: 16/421,379

(22) Filed: May 23, 2019

(51) Int. Cl.
*H02J 7/00* (2006.01)
*G06F 1/16* (2006.01)
*H01M 10/44* (2006.01)

(52) U.S. Cl.
CPC ............ *G06F 1/1635* (2013.01); *G06F 1/163* (2013.01); *H02J 7/0013* (2013.01); *H01M 10/44* (2013.01); *H01M 2220/30* (2013.01)

(58) Field of Classification Search
USPC .......................................... 320/112, 114, 116
See application file for complete search history.

(56) References Cited

U.S. PATENT DOCUMENTS

| 10,983,591 | B1 * | 4/2021 | Ouderkirk | G02B 27/017 |
| 2015/0112153 | A1 * | 4/2015 | Nahum | A61B 5/291 |
| | | | | 600/301 |
| 2018/0227658 | A1 * | 8/2018 | Hviid | A61B 5/117 |

FOREIGN PATENT DOCUMENTS

| CN | 109061882 A | * | 12/2018 |
| CN | 209148961 U | * | 7/2019 |

OTHER PUBLICATIONS

Road to VR (Hands-on: Oculus' Wireless 'Santa Cruz' Prototype Makes Standalone Room-scale Tracking a Reality, https://www.roadtovr.com/hands-on-oculus-wireless-santa-cruz-prototype-makes-standalone-room-scale-tracking-a-reality/ Oct. 6, 2016) (Year: 2016).*

* cited by examiner

*Primary Examiner* — Brian Ngo
(74) *Attorney, Agent, or Firm* — Morgan, Lewis & Bockius LLP

(57) ABSTRACT

An artificial-reality headset assembly includes an artificial-reality headset, a battery pack, and a plurality of head straps. One end of each of the head straps is coupled to the artificial-reality headset and the respective opposite end is coupled to the battery pack. The plurality of head straps includes one or more side straps configured to be worn around a user's head. The battery pack is located in proximity to a posterior portion of the user's head when the artificial-reality headset is worn. The position and weight of the battery pack function to counterbalance weight of the artificial-reality headset, creating a symmetric balance along an axis of the user's head and maintaining the position of the battery pack regardless of adjustment to the one or more side straps. In some embodiments, the plurality of head straps includes an overhead strap (e.g., an adjustable ergonomic strap).

14 Claims, 8 Drawing Sheets

100
Headset Assembly with Battery at the Back

ARTIFICIAL-REALITY HEADSET ASSEMBLY WITH BACK-OF-THE-HEAD BATTERY

TECHNICAL FIELD

The disclosed implementations relate generally to artificial reality systems, and more specifically to headset assemblies for artificial reality systems.

BACKGROUND

Artificial-reality devices have wide applications in various fields, including engineering design, medical surgery practice, military simulated practice, and video gaming. Audio is a critical element of any artificial-reality device (e.g., virtual, augmented, or mixed-reality devices). Artificial-reality devices typically include one or more audio devices (e.g., speakers) positioned in proximity to a user's ears, or audio devices that completely cover the user's ears, such as headphones. To meet the growing demand for artificial-reality devices, technology companies are developing portable electronic devices, such as VR headsets or head-mounted display systems. For improved user experience, consumer electronic devices, such as VR headsets, have to be designed to be comfortable for extended wear. VR headsets also have to meet product use-case and aesthetic requirements. Head-mounted displays have several components that both occupy space and carry weight. An important component in portable devices is a battery that allows the device to operate independently of an external power source. In order to provide an immersive experience, individual components, such as batteries and displays, have to be organized and placed so that they minimize discomfort.

SUMMARY

Accordingly, there is a need for a headset assembly design that balances functional and aesthetic requirements. Artificial-reality headset assemblies designed using the techniques described herein can improve overall user experience and make it convenient for users to use the headsets for extended periods of time. For example, because the battery designed to be worn in a posterior portion of a user's head counterbalances the weight of a display unit configured to rest on a user's nose, the weight is more uniformly distributed, allowing the user to experience minimal discomfort during extended periods of use.

In one aspect, an artificial-reality (e.g., a virtual reality (VR)) headset assembly is provided, according to some implementations. The artificial-reality headset assembly includes an artificial-reality headset, a battery pack, and a plurality of head straps. One end of each of the head straps is coupled to the artificial-reality headset and a respective opposite end is coupled to the battery pack. The plurality of head straps includes one or more side straps configured to be worn around a user's head. The battery pack is located in proximity to a posterior portion of the user's head when the artificial-reality headset is worn. A position and weight of the battery pack function to counterbalance weight of the artificial-reality headset, creating a symmetric balance along an axis of the user's head, and maintaining the position of the battery pack in proximity to the posterior portion of the user's head regardless of adjustment to the one or more side straps.

In some implementations, the plurality of head straps further includes an overhead strap configured to be worn over the user's head. In some implementations, the position and weight of the battery pack function to counterbalance the weight of the artificial-reality headset based at least on the length, material, and weight of the overhead strap. In some implementations, the overhead strap is an adjustable ergonomic strap. In some implementations, the overhead strap includes a fixed-length power line connected to the battery pack on one end and connected to the artificial-reality headset on the opposite end. The power line is configured to supply power from the battery pack to the artificial-reality headset.

In some implementations, charging circuitry for the battery pack is housed along with the battery pack.

In some implementations, the position and weight of the battery pack function to counterbalance the weight of the artificial-reality headset based at least on the symmetry of the battery pack.

In some implementations, at least one side strap of the one or more side straps includes a power line connected to the battery pack on one end and to the artificial-reality headset on the opposite end. The power line is configured to supply power from the battery pack to the artificial-reality headset.

Thus headset assemblies are provided that locate battery packs to distribute the overall weight, providing a more comfortable experience for users.

In another aspect, some implementations include a battery pack for an artificial-reality headset. The battery pack includes one or more battery modules configured to provide power to the artificial-reality headset, and one or more adapters configured to mechanically and electrically couple the battery pack to the artificial-reality headset. The battery pack is configured to be located in proximity to a posterior portion of a user's head when the artificial-reality headset is worn by the user. The position and weight of the battery pack function to counterbalance the weight of the artificial-reality headset, to create a symmetric balance along an axis of the user's head, and/or to maintain the position of the battery pack in proximity to the posterior portion of the user's head regardless of adjustment to one or more straps configured to couple the battery pack to the artificial-reality headset via the one or more adapters.

In some implementations, the one or more straps includes an adjustable ergonomic strap. In some implementations, the one or more straps includes an overhead strap. In some implementations, the one or more straps includes a side strap configured to be worn around the user's head.

In some implementations, the one or more battery modules are configured to provide power to the artificial-reality headset via a power management module. The power management module is configured to control (or manage) power provided to the artificial-reality headset. In some implementations, the power management module is configured to be located in proximity to an anterior portion of the user's head when the artificial-reality headset is worn. In some implementations, the power management module is configured to be located in proximity to a posterior portion of the user's head when the artificial-reality headset is worn.

In some implementations, the one or more battery modules are electrically coupled to one or more charging circuits configured to charge the one or more battery modules.

In some implementations, the one or more charging circuits are configured to be located in proximity to an anterior portion of the user's head when the artificial-reality headset is worn. In some implementations, the one or more charging circuits are configured to be located in proximity to a posterior portion of the user's head when the artificial-reality headset is worn.

In some implementations, the battery pack includes a housing. The one or more battery modules are mounted within the housing, and the one or more adapters are located outside the housing. In some implementations, the battery pack includes a charging circuit (e.g., mounted within the housing) electrically coupled to the one or more battery modules. The charging circuit is configured to charge the one or more battery modules.

Thus, battery packs are provided that are configured to be located at the posterior portion of an artificial-reality headset assembly so as to distribute the overall weight, providing a more comfortable experience for users.

BRIEF DESCRIPTION OF THE DRAWINGS

For a better understanding of the aforementioned implementations of the invention as well as additional implementations, reference should be made to the Description of Implementations below, in conjunction with the following drawings, in which like reference numerals refer to corresponding parts throughout the figures.

Reference will now be made in detail to implementations, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Embodiments of this disclosure may include or be implemented in conjunction with various types of artificial-reality systems. "Artificial reality" constitutes any form of reality that has been altered by virtual objects for presentation to a user. Such artificial reality may include and/or represent virtual reality (VR), augmented reality (AR), mixed reality (MR), hybrid reality, or some combination and/or variation of one or more of the these. Artificial-reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect for a viewer). In some implementations, artificial reality may also be associated with applications, products, accessories, services, or some combination thereof, which are used, for example, to create content in an artificial reality and/or are otherwise used in (e.g., to perform activities in) an artificial reality.

Figure 1A:
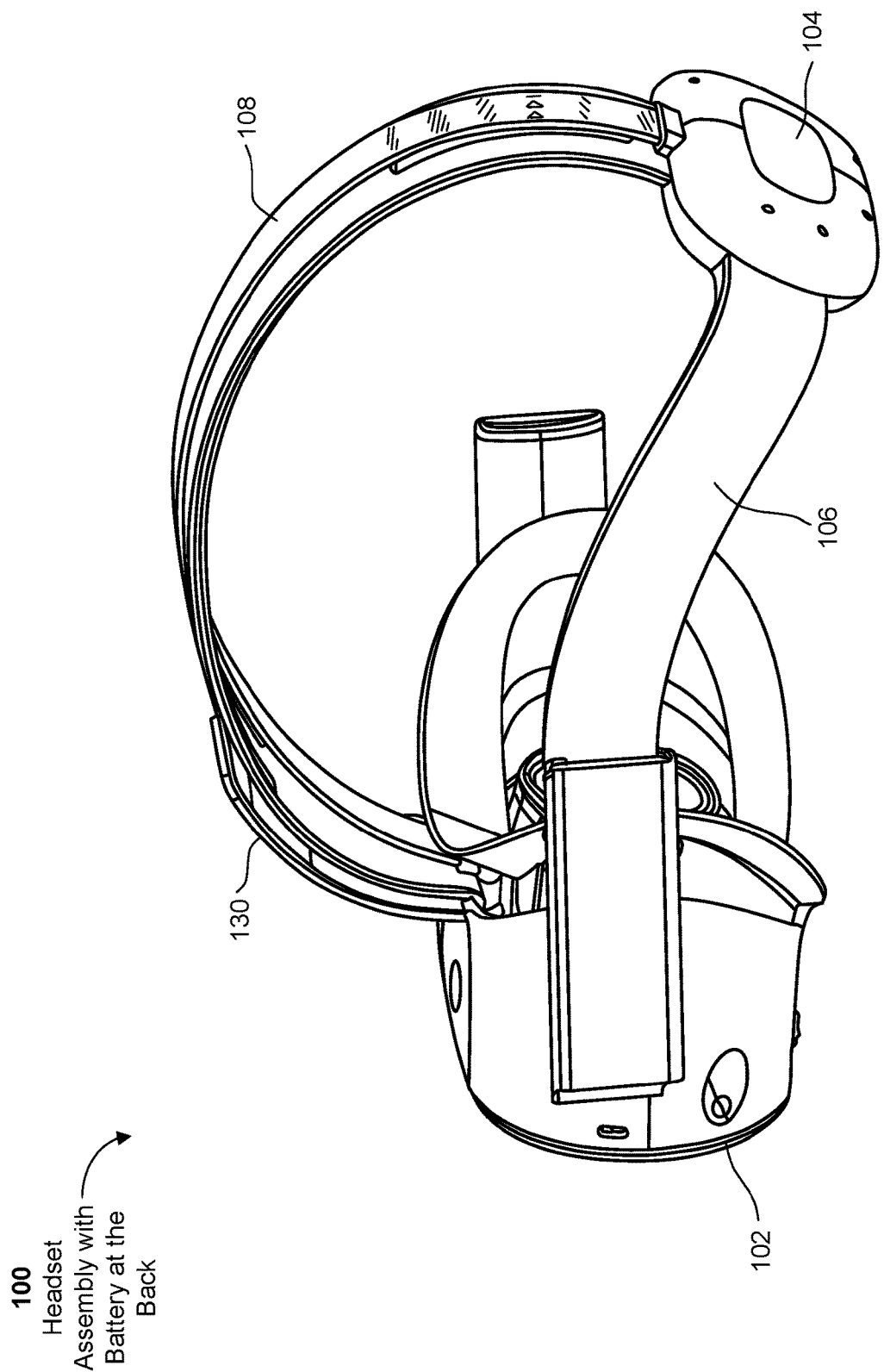
FIGS. 1A-1C illustrate a virtual reality headset assembly with battery pack at the back of the assembly, according to some implementations.
Figure 1B:
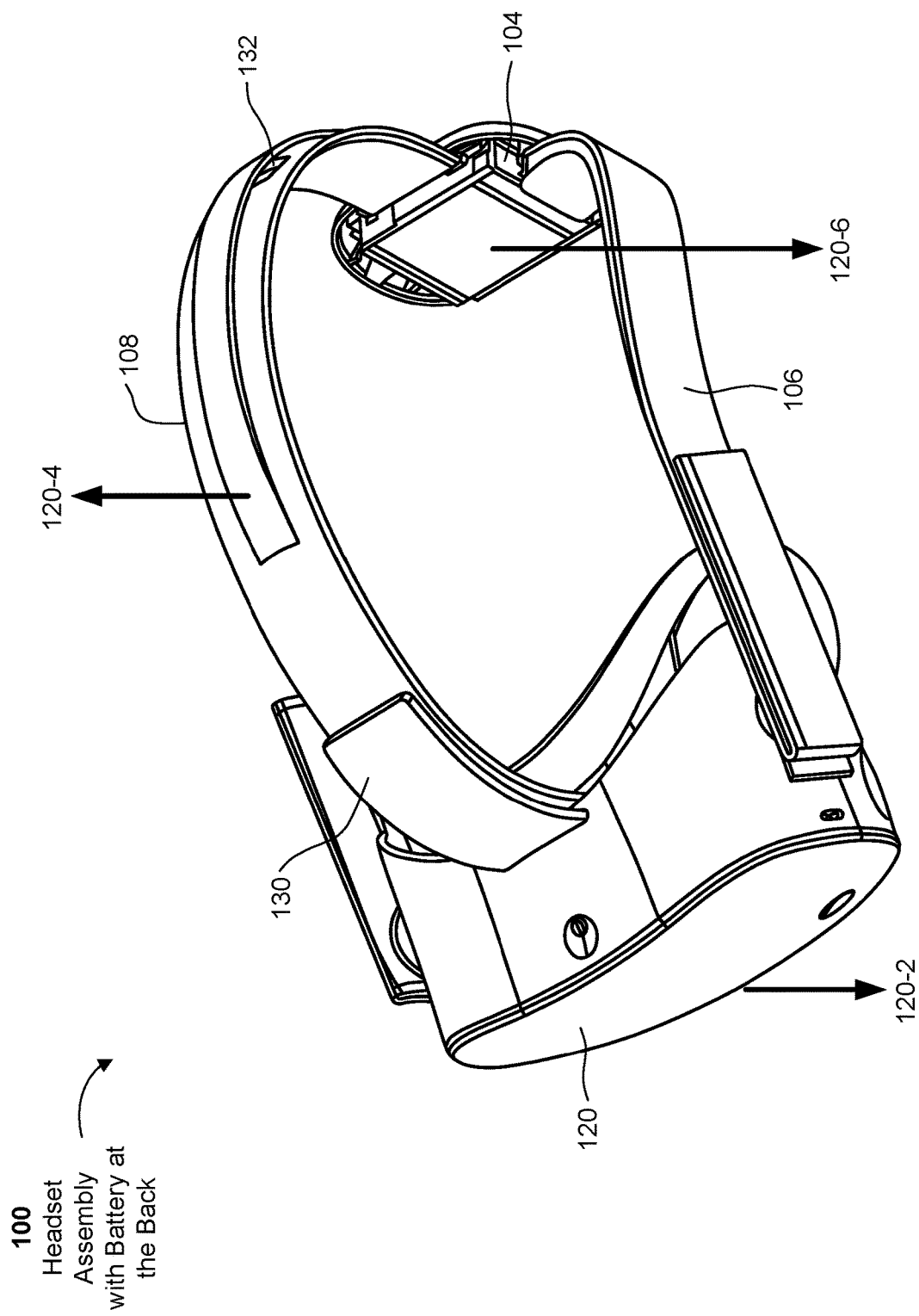
Figure 1C:
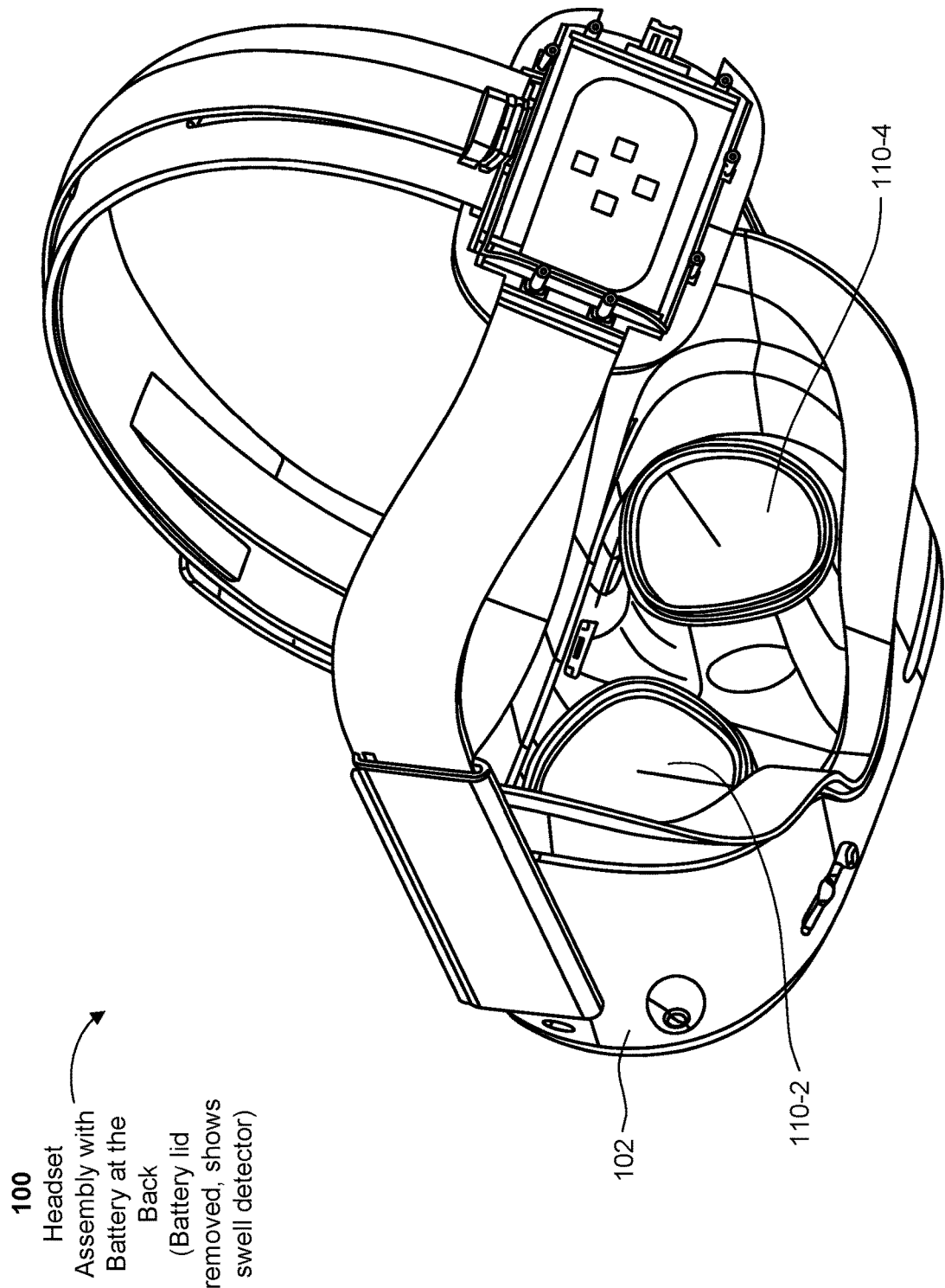

FIGS. 1A-1C illustrate a virtual reality (VR) headset assembly with battery at the back of the assembly, according to some implementations. FIG. 1A is a left-side isometric view of the VR headset assembly. The VR headset assembly 100 includes a VR headset 102, a battery pack 104, and a plurality of head straps (e.g., a side strap 106 and a top strap 108). One end of each of the head straps is coupled to the VR headset and the respective opposite end is coupled to the battery pack. For example, one end of the head strap 106 is connected to the headset 102, and the opposite end is connected to the battery pack 104. The plurality of head straps include one or more side straps 106 configured to be worn around a user's head. For example, the headset assembly 100 includes a side strap 106 designed to be worn around a user's head (e.g., above the user's left ear).

The battery pack 104 is located in proximity to a posterior portion of the user's head (sometimes called the back of the head) when the VR headset is worn. For example, a user would wear the headset assembly 100 shown in FIG. 1A so as to view a display within the headset 102, which would place the battery at the back of the user's head. The display within the headset 102 is more clearly illustrated in FIG. 1C, showing a left display 110-2 and a right display 110-4, according to some implementations.

The position and weight of the battery pack function to counterbalance weight of the VR headset, to create a symmetric balance along an axis of the user's head, and to maintain the position of the battery pack in proximity to the posterior portion of the user's head regardless of adjustment to the one or more side straps.

In some implementations, the plurality of head straps further includes an overhead strap 108 configured to be worn over the user's head. In some implementations, the position and weight of the battery pack 104 function to counterbalance the weight of the VR headset 102 based at least on the length, material, and weight of the overhead strap 108.

To illustrate, referring now to FIG. 1B, when a user wears the headset assembly 100, there are at least three forces that come into play, according to some implementations. The weight of the headset 102, shown by a first arrow 120-2 (approximately centered around the center of the gravity of the headset 102), pulls the headset down in the front portion of the assembly (e.g., weighing on the user's nose). In some implementations, the weight 120-2 is also supported by one or more side straps 106 worn around the user's head. Towards the back portion of the assembly 100, the battery pack 104 exerts its own weight (shown by the third arrow 120-6 approximately centered around the center of gravity of the battery pack 104), according to some implementations.

When the headset assembly 100 is worn, the overhead strap 108 is pushed upwards by a force 120-4 (by the user's head), pointing in the opposite direction of the first and third forces 120-2 and 120-6. This weight of the headset assembly exerts an opposite force on the user's head (not shown). Without battery placement at the back of the assembly 100, the first force 120-2 has to be supported by other means, such as by the user's nose, or by side straps (themselves supported by an overhead connecting strap). With the battery placement at the back of the head, as shown in FIGS. 1A-1C, the battery pack weight 120-6 acts to counterbalance the headset weight 120-2, so the weights are more uniformly distributed around the user's head (i.e., when the user wears the headset assembly 100), thereby stopping undue stress or minimizing discomfort to the user. Irrespective of adjustments to the side strap 106, the headset weight 120-2 and the battery pack weight 120-6 are supported by the force 120-4 from the user's head.

Although FIGS. 1A-1C illustrate a single side strap 106 and an overhead strap 108, alternative implementations are possible keeping the counterbalancing principle in mind, placing the battery pack 104 at the back of the assembly 100. For example, with two or more side straps similar to the side strap 106, the weight can be more uniformly distributed around a user's head. Two or more side straps can cumulatively support the weights (using friction) distributed around the circumference of the user's head.

Some implementations use two or more side straps coupled to the headset 102 (in the front of the assembly) and the battery pack 104 (at the back of the assembly), and support the headset weight 120-2 and the battery pack weight 120-6 with one or more overhead straps 108 that connect the two or more side straps in a direction that is approximately perpendicular to the direction of the overhead strap 108 shown in FIGS. 1A-1C.

Regardless of the number, position, and material of the straps, placement of the battery pack at the back of the assembly allows for more uniform distribution of weights (compared to when the battery pack is housed along with the headset). Placement of the battery pack at the back of the assembly (or near the back of the assembly) avoids the headset assembly from tilting or exerting undue stress on a user due to the headset force 120-2.

Additionally, the placement of the battery pack 104 at the back of the assembly 100 creates a symmetric balance along an axis of the user's head. For example, the assembly 100 can be worn by a user to place the headset 102 and the battery pack 104 aligned along an axis of the user's head so that, even if the user moves while experiencing VR content, the assembly 100 is undisturbed from its position of symmetry on the user's head.

Furthermore, the placement of the battery pack 104 at the back of the assembly 100, maintains the position of the battery pack in proximity to the posterior portion of the user's head regardless of adjustment to the one or more side straps. As described earlier, because the weights are counterbalanced, while the one or more side straps can be adjusted, any adjustment only minimally impacts the battery pack 104, and the battery pack 104 continues to stay in its position at the back of the assembly 100.

In some implementations, the overhead strap 108 is an adjustable ergonomic strap. For example, in FIG. 1B, the overhead strap 108 is shown with an adjustable mechanism 130 that can tighten or lengthen the overhead strap 108.

In some implementations, the overhead strap 108 includes a fixed-length power line connected to the battery pack on one end and the VR headset on an opposite end. The power line is configured to supply power from the battery pack to the VR headset. When the overhead strap 108 is shortened for fit, the fixed-length power line forms a loop extending away from the overhead strap 108. In some implementations, the loop is at a location 132 near the rear of the overhead strap 108.

Figure 2A:
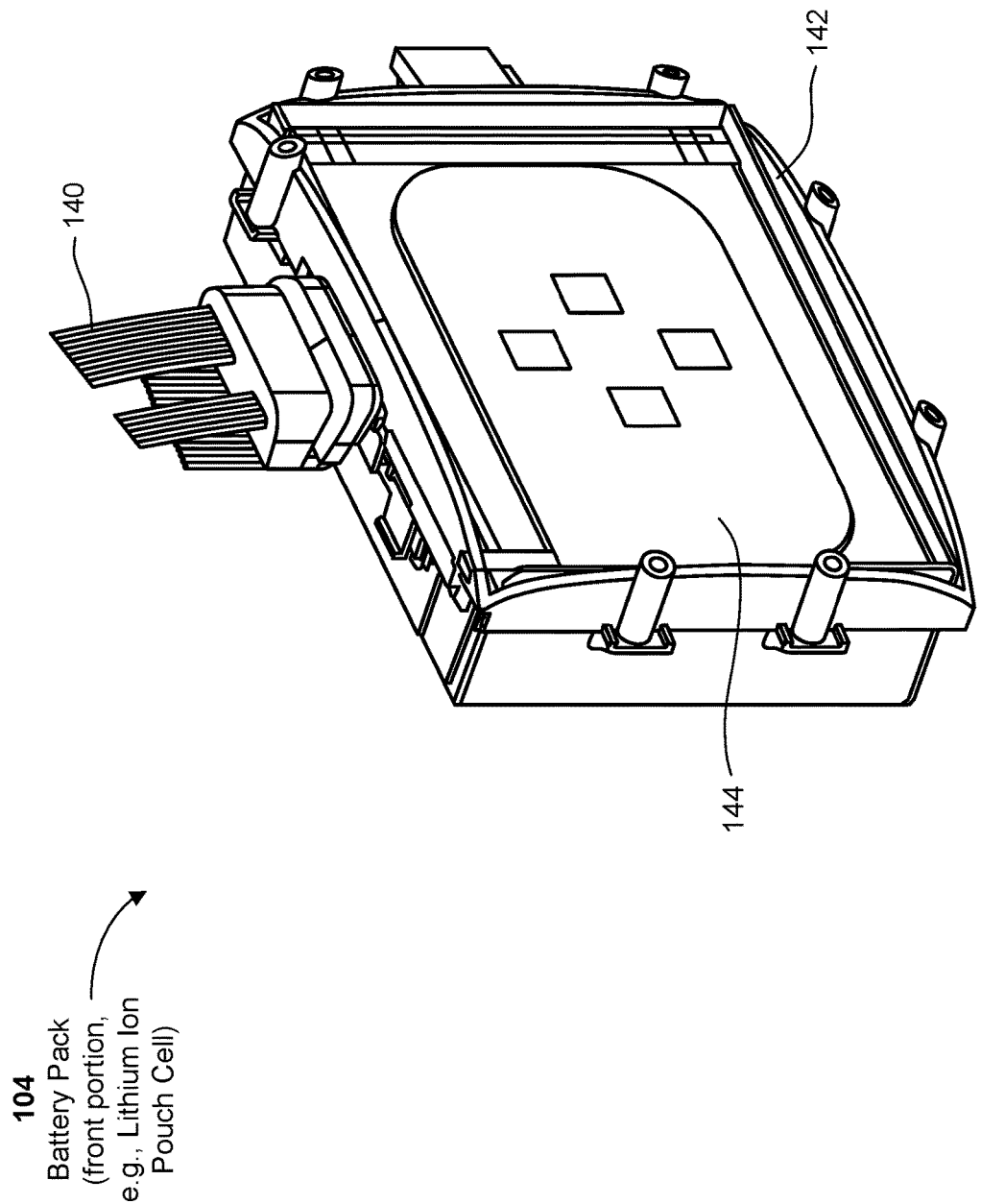
FIGS. 2A and 2B provide views of a battery pack used in a virtual reality headset assembly, according to some implementations.
Figure 2B:
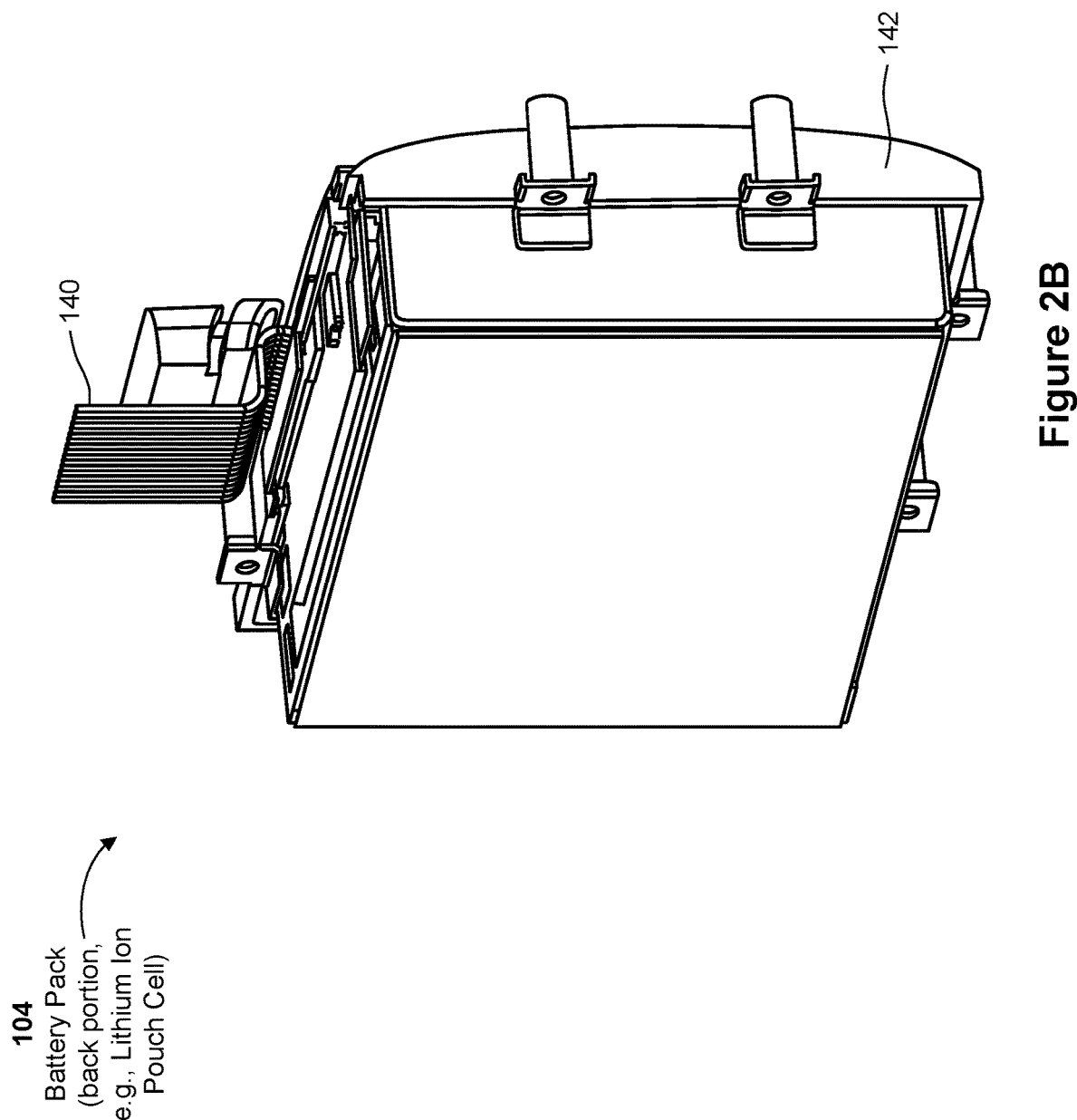

FIGS. 2A and 2B provide views of a battery pack 104 used in a virtual reality headset assembly 100, according to some implementations. The battery pack 104 is placed in a housing 142, and has power line extensions 140. In some implementations, the battery pack 104 has a swell detector circuit 144 (e.g., a flex-layer based circuit) adhered to the battery pack 104 to detect battery swells. The power line extensions run or connect to the headset 102 via the overhead strap 108, according to some implementations. In some implementations, at least one side strap of the one or more side straps includes a power line connected to the battery pack on one end and to the VR headset on an opposite end. The power line is configured to supply power from the battery pack to the VR headset. For example, the power lines 140 electrically connect to the headset 102 via one or more side straps (e.g., strap 106).

In some implementations, charging circuitry (not shown) for the battery pack is housed along with the battery pack. In some implementations, the charging circuitry is included in the headset 102.

In some implementations, the position and weight of the battery pack function to counterbalance the weight of the VR headset 102 based at least on the symmetry of the battery pack 104 with the headset 102. For example, since the battery pack 104 shown in FIGS. 1A-1C is rectilinear in shape, the distribution of the battery pack force 120-6 (e.g., the center of gravity of the force 120-6) depends on the battery pack 104 and influences the counterbalancing effect discussed above. Other battery pack shapes (e.g., triangular) are possible, and do not impact the overall counterbalancing feature except that the position of the center of gravity differs.

Figure 3B:
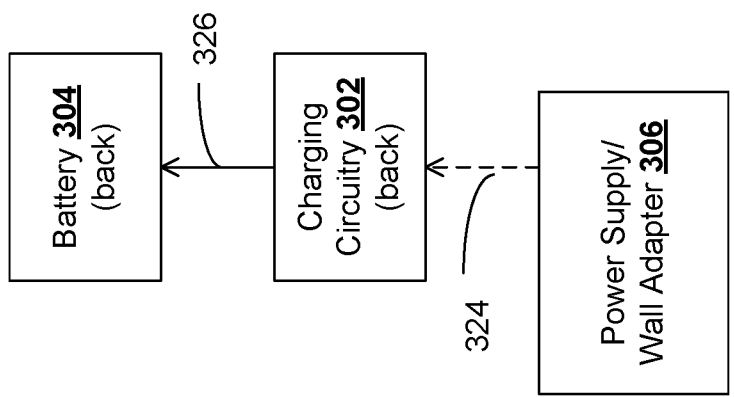
FIG. 3B is another block diagram of an electrical circuit to charge a battery placed at the back of a headset assembly, according to some implementations.
Figure 3A:
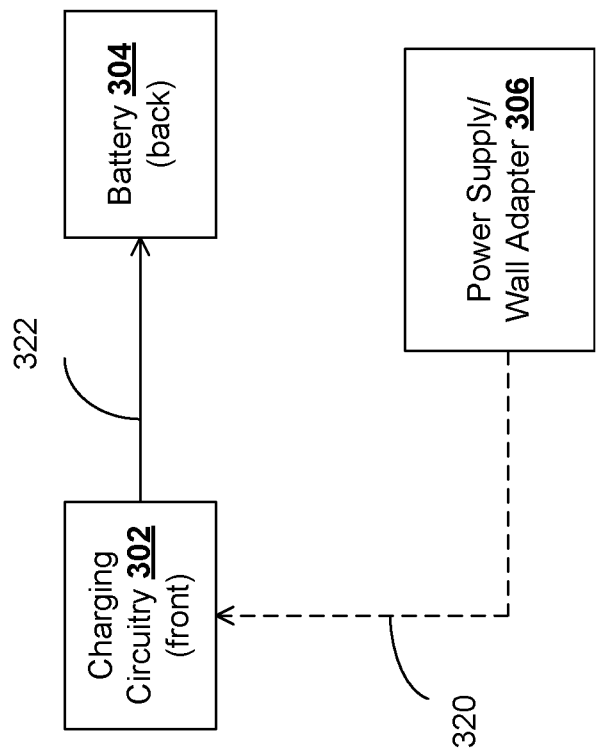
FIG. 3A is a block diagram of an electrical circuit to charge a battery placed at the back of a headset assembly, according to some implementations.

FIG. 3A is a block diagram of an electrical circuit to charge a battery placed at the back of a headset assembly, according to some implementations. The circuit includes charging circuitry 302 placed at the front of the assembly. The circuitry 302 is electrically connected (322) to a battery 304 placed at the back of the assembly, according to some implementations. At the time of charging, the charging circuitry 302 is electrically connected (320) to a power supply or a wall adapter 306 (e.g., an external power supply). In some implementations, the assembly includes a plug (not shown) at the front of the assembly to connect the charging circuitry 302 to the power supply 306.

FIG. 3B is another block diagram of an electrical charging circuit of a headset assembly with battery at the back of the assembly, according to some implementations. In contrast to FIG. 3A, the circuit includes charging circuitry 302 placed at the back of the assembly. The circuitry 302 is electrically connected (326) to a battery 304 placed at the back of the assembly, according to some implementations. At the time of charging, the charging circuitry 302 is electrically connected (324) to a power supply or a wall adapter 306 (e.g., an external power supply). In some implementations, the assembly includes a plug (not shown) at the back of the assembly to connect the charging circuitry 302 to the power supply 306.

Figure 3D:
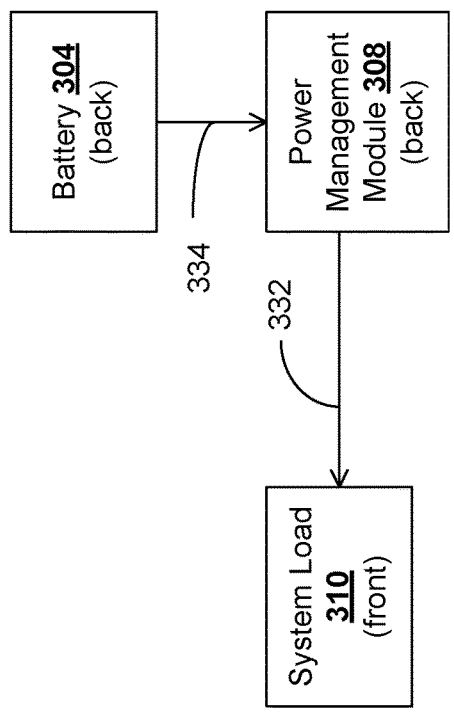
FIG. 3D is another block diagram of an electrical circuit of a headset assembly with battery at the back of the assembly illustrating the discharging of the battery, according to some implementations.
Figure 3C:
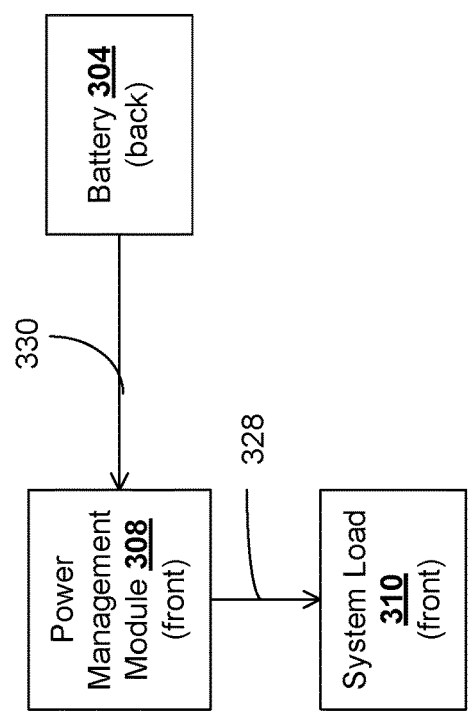
FIG. 3C is a block diagram of an electrical circuit of a headset assembly with battery at the back of the assembly illustrating the discharging of the battery, according to some implementations.

FIG. 3C is a block diagram of an electrical circuit of a headset assembly with battery at the back of the assembly illustrating the discharging of the battery, according to some implementations. The circuit includes a power management module 302 placed at the front of the assembly. The module 302 is electrically connected (330) to a battery 304 placed at the back of the assembly, according to some implementations. The power management module 302 (e.g., a system that includes a boost or buck converter, or other fuel gauging apparatus) is electrically connected (328) to a system load 310 (e.g., a head mounted display system needing battery power). When the battery 304 is used to supply power, the power management module 308 at the front of the assembly receives power from the battery 304 at the back of the assembly, and supplies power to the system load 310 (e.g., a display system at the front of the assembly), according to some implementations.

FIG. 3D is a block diagram of an electrical circuit of a headset assembly with the battery at the back of the assembly, illustrating the discharging of the battery, according to some implementations. In contrast to FIG. 3C, the circuit includes a power management module 308 placed at the back of the assembly. The module 308 is electrically connected (334) to a battery 304 placed at the back of the assembly, according to some implementations. The power management module 302 is electrically connected (332) to a system load 310 (e.g., a head mounted display system needing battery power) at the front of the assembly. When the battery 304 is used to supply power, the power management module 308 at the back of the assembly receives power from the battery 304 at the back of the assembly, and supplies power to the system load 310 at the front of the assembly, according to some implementations.

In various implementations, the electrical connections from the battery to the electrical system of the headset assembly (e.g., the connection 322 of FIG. 3A, the connection 326 of FIG. 3B, the connection 330 of FIG. 3C, or the connection 334 of FIG. 3D) include captive fixed cable (e.g., cable attached to the system and/or the battery), detachable cables (e.g., using proprietary connectors), and/or standard interface cable (e.g., a USB cable). Further, these cables or electrical connections may be free standing or integrated into one of the straps of the headset assembly, according to some implementations.

In another aspect, some implementations include a battery pack 104 (such as the battery pack in FIGS. 2A and 2B) for an artificial-reality headset. The battery pack includes one or more battery modules (not shown) configured to provide power to the artificial-reality headset (e.g., the VR headset 100), and one or more adapters (not shown) configured to mechanically and/or electrically couple the battery pack to the artificial-reality headset. For example, in FIG. 2A, the battery pack is configured to be located in proximity to a posterior portion of a user's head when the artificial-reality headset is worn by the user. For example, by using straps attached to the battery pack's adapters, the battery pack can be located in proximity to a posterior portion of a user's head when the artificial-reality headset is worn by the user. The position and weight of the battery pack function to counterbalance the weight of the artificial-reality headset, to create a symmetric balance along an axis of the user's head, and/or to maintain the position of the battery pack in proximity to the posterior portion of the user's head regardless of adjustment to one or more straps configured to couple the battery pack to the artificial-reality headset via the adapters. In some implementations, the position and the weight of the battery pack are calibrated (e.g., at the time of manufacturing of the headset assembly) in order to counterbalance the weight of the artificial-reality headset, to create a symmetric balance along an axis of the user's head, and/or to maintain the position of the battery pack in proximity to the posterior portion of the user's head.

In some implementations, the one or more straps include an adjustable ergonomic strap. In some implementations, the one or more straps include an overhead strap (e.g., the strap 108). In some implementations, the one or more straps include a side strap (e.g., the strap 106) configured to be worn around the user's head.

In some implementations, the one or more battery modules are configured to provide power to the artificial-reality headset via a power management module 308. The power management module is configured to control (or manage) power provided to the artificial-reality headset. In some implementations, the power management module is configured to be located in proximity to an anterior portion of the user's head when the artificial-reality headset is worn. In some implementations, the power management module is configured to be located in proximity to a posterior portion of the user's head when the artificial-reality headset is worn.

In some implementations, the one or more battery modules are electrically coupled to one or more charging circuits 302 configured to charge the one or more battery modules. In some implementations, the one or more charging circuits are configured to be located in proximity to an anterior portion of the user's head when the artificial-reality headset is worn. In some implementations, the one or more charging circuits are configured to be located in proximity to a posterior portion of the user's head when the artificial-reality headset is worn.

In some implementations, the battery pack includes a housing. For example, in FIG. 2A, the battery pack 104 is placed in the housing 142, and has power line extensions 140. In some implementations, the battery pack 104 includes the housing 142. The one or more battery modules are mounted within the housing, and the adapters are located outside the housing. In some implementations, the battery pack includes a charging circuit (e.g., mounted within the housing) electrically coupled to the one or more battery modules. The charging circuit is configured to charge the one or more battery modules.

Figure 4:
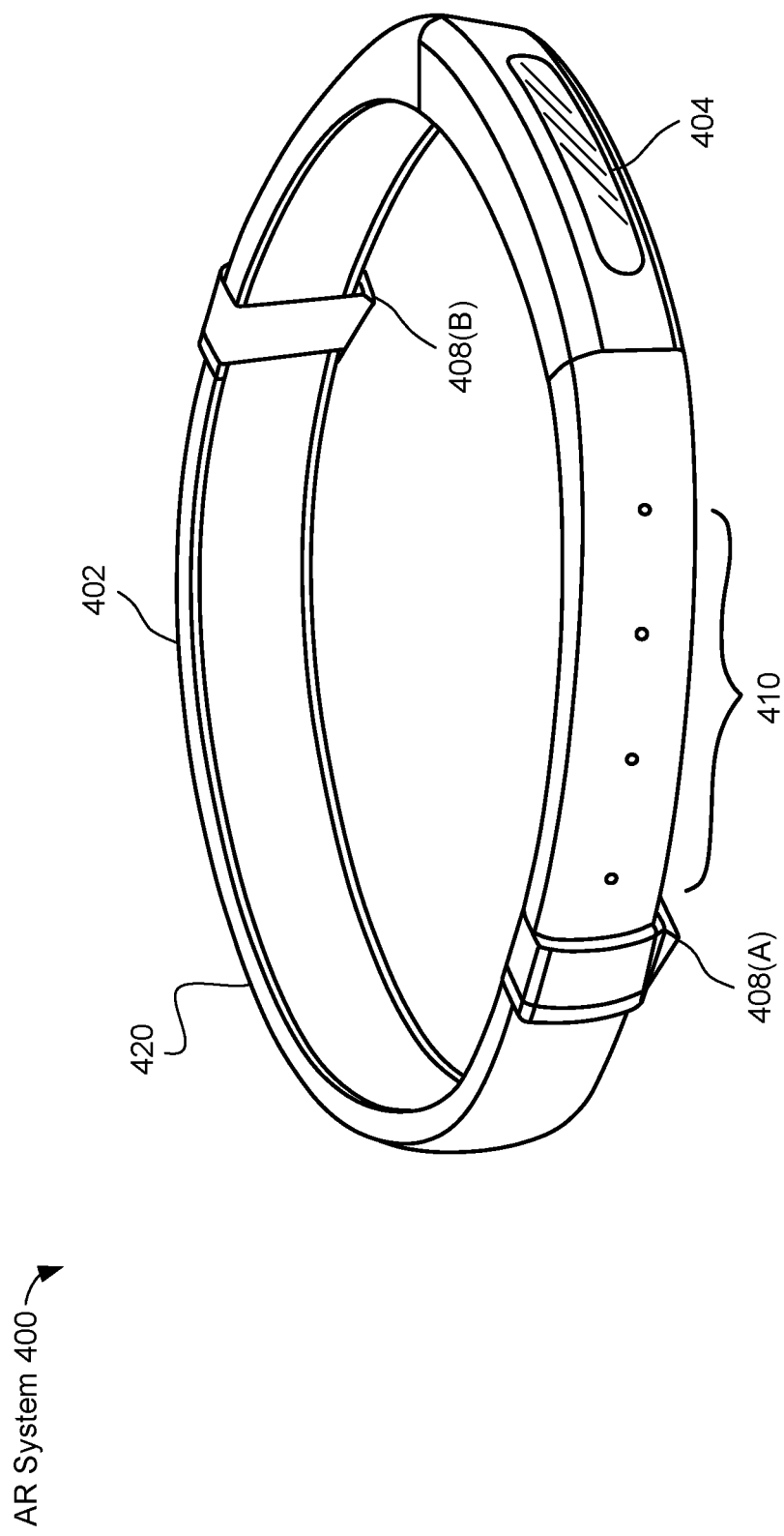
FIG. 4 illustrates an example of an artificial-reality device, according to some implementations.

As described above, embodiments of this disclosure may include or be implemented in conjunction with various types of artificial-reality systems. Artificial-reality systems may be implemented in a variety of different form factors and configurations. FIG. 4 provides an example of an artificial-reality device. Some artificial reality systems are designed to work without near-eye displays (NEDs), such as the AR system 400 in FIG. 4. Other artificial reality systems include an NED, which provides visibility into the real world or that visually immerses a user in an artificial reality. While some artificial reality devices are self-contained systems, other artificial reality devices communicate and/or coordinate with external devices to provide an artificial reality experience to a user. Examples of such external devices include handheld controllers, mobile devices, desktop computers, devices worn by a user, devices worn by one or more other users, and/or any other suitable external system.

The AR system 400 in FIG. 4 generally represents a wearable device dimensioned to fit about a body part of a user. As shown, the AR system 400 includes a frame 402 (e.g., a band) and a camera assembly 404, which is coupled to the frame 402 and configured to gather information about a local environment by observing the local environment. The AR system 400 may also include one or more transducers. In one example, the AR system 400 includes output transducers 408(A) and 408(B) and input transducers 410. The output transducers 408(A) and 408(B) may provide audio feedback, haptic feedback, and/or content to a user, and the input audio transducers may capture audio (or other signals/ waves) in a user's environment. Similar to the headset assembly 100 illustrated in FIG. 1A, the AR system 400 in FIG. 4 may include a battery (e.g., the battery 104) at the back of the assembly 420, according to some implementations.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although the examples described above identify a virtual reality headset/assembly, the same techniques apply to any artificial reality device.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. An artificial-reality headset assembly, comprising:
an artificial-reality headset;
a battery pack; and
a plurality of head straps, one end of each of the head straps coupled to the artificial-reality headset and a respective opposite end coupled to the battery pack, the plurality of head straps including (i) one or more side straps configured to be worn around a user's head and (ii) an adjustable ergonomic overhead strap configured to be worn over the user's head, wherein the overhead strap includes a fixed-length power line that forms a loop near a rear end of the overhead strap and extending away from the overhead strap when the overhead strap is shortened for fit;
wherein the battery pack is located in proximity to a posterior portion of the user's head when the artificial-reality headset is worn, a position and weight of the battery pack functioning to counterbalance weight of the artificial-reality headset, to create a symmetric balance along an axis of the user's head, and to maintain the position of the battery pack in proximity to the posterior portion of the user's head regardless of adjustment to the one or more side straps.

2. The artificial-reality headset assembly of claim 1, wherein the position and weight of the battery pack function to counterbalance the weight of the artificial-reality headset based at least on the length, material, and weight of the overhead strap.

3. The artificial-reality headset assembly of claim 1, further comprising a charging circuit, wherein the charging circuit is housed along with the battery pack.

4. The artificial-reality headset assembly of claim 1, further comprising a charging circuit, wherein the charging circuit is housed in the artificial-reality headset.

5. The artificial-reality headset assembly of claim 1, wherein the position and weight of the battery pack function to counterbalance the weight of the artificial-reality headset based in part on the symmetry of the battery pack.

6. A battery pack for an artificial-reality headset, comprising:
one or more battery modules configured to provide power to the artificial-reality headset;
one or more adapters configured to mechanically and electrically couple the battery pack to the artificial-reality headset; and
a plurality of head straps, one end of each of the head straps coupled to the artificial-reality headset and a respective opposite end coupled to the battery pack, the plurality of head straps including (i) one or more side straps configured to be worn around a user's head and (ii) an adjustable ergonomic overhead strap configured to be worn over the user's head, wherein the overhead strap includes a fixed-length power line that forms a loop near a rear end of the overhead strap and extending away from the overhead strap when the overhead strap is shortened for fit, wherein:
the battery pack is configured to be located in proximity to a posterior portion of a user's head when the artificial-reality headset is worn by the user, a position and weight of the battery pack functioning to counterbalance weight of the artificial-reality headset, to create a symmetric balance along an axis of the user's head, and to maintain the position of the battery pack in proximity to the posterior portion of the user's head regardless of adjustment to one or more straps configured to couple the battery pack to the artificial-reality headset via the one or more adapters.

7. The battery pack of claim 6, wherein the one or more battery modules are further configured to provide power to the artificial-reality headset via a power management module, the power management module configured to control power provided to the artificial-reality headset.

8. The battery pack of claim 7, wherein the power management module is configured to be located in proximity to an anterior portion of the user's head when the artificial-reality headset is worn.

9. The battery pack of claim 7, wherein the power management module is configured to be located in proximity to a posterior portion of the user's head when the artificial-reality headset is worn.

10. The battery pack of claim 6, wherein the one or more battery modules are electrically coupled to one or more charging circuits configured to charge the one or more battery modules.

11. The battery pack of claim 10, wherein the one or more charging circuits are configured to be located in proximity to an anterior portion of the user's head when the artificial-reality headset is worn.

12. The battery pack of claim 10, wherein the one or more charging circuits are configured to be located in proximity to a posterior portion of the user's head when the artificial-reality headset is worn.

13. The battery pack of claim 6, further comprising a housing, wherein the one or more battery modules are mounted within the housing, and the one or more adapters are mounted outside the housing.

14. The battery pack of claim 13, further comprising a charging circuit electrically coupled to the one or more battery modules, the charging circuit configured to charge the one or more battery modules, wherein the charging circuit is mounted within the housing.

* * * * *